(12) United States Patent
Xu

(10) Patent No.: US 8,416,712 B2
(45) Date of Patent: Apr. 9, 2013

(54) METHOD AND DEVICE FOR INSTALLING AND DISTRIBUTING ROUTES

(75) Inventor: Xiaohu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 332 days.

(21) Appl. No.: 12/880,948

(22) Filed: Sep. 13, 2010

(65) Prior Publication Data

US 2010/0329153 A1 Dec. 30, 2010

Related U.S. Application Data

(63) Continuation of application No. PCT/CN2009/070466, filed on Feb. 18, 2009.

(30) Foreign Application Priority Data

Mar. 13, 2008 (CN) .......................... 2008 1 0065824

(51) Int. Cl.
*H04L 12/28* (2006.01)

(52) U.S. Cl.
USPC ............................ 370/254; 370/401; 370/431

(58) Field of Classification Search ....... 370/229–230.1, 370/252, 254, 351, 392, 400, 401, 431, 464
See application file for complete search history.

(56) References Cited

U.S. PATENT DOCUMENTS

| 6,247,057 | B1 | 6/2001 | Barrera, III | |
| 2005/0074003 | A1* | 4/2005 | Ball et al. ...................... | 370/389 |
| 2006/0133390 | A1* | 6/2006 | Sreekantiah et al. ......... | 370/401 |
| 2006/0140136 | A1 | 6/2006 | Filsfils et al. | |
| 2006/0268681 | A1 | 11/2006 | Raza | |
| 2008/0147843 | A1* | 6/2008 | Scudder et al. ............... | 709/223 |

FOREIGN PATENT DOCUMENTS

| CN | 1719831 A | 1/2006 |
| CN | 101014014 A | 8/2007 |
| CN | 101068203 A | 11/2007 |
| EP | 1 130 849 A2 | 9/2001 |
| KR | 2002-0096568 | 12/2002 |
| MX | PA05009370 A | 3/2006 |

OTHER PUBLICATIONS

Ballani, Hitesh et al. "A Dirty-Slate Approach to Routing Scalability." Computing and information Science Technical Reports. Jul. 10, 2008.
International Search Report issued in corresponding PCT Application No. PCT/CN2009/070466; mailed Jun. 4, 2009.
Office Action issued in corresponding Chinese Patent Application No. 200810065824.1, mailed May 16, 2011.
Office Action issued in corresponding European Patent Application No. 09720648.6, mailed Oct. 6, 2011.
Written Opinion of the International Searching Authority issued in corresponding PCT Patent Application No. PCT/CN2009/070466, mailed Jun. 4, 2009.

(Continued)

*Primary Examiner* — Kerri Rose
(74) *Attorney, Agent, or Firm* — Brinks Hofer Gilson & Lione

(57) ABSTRACT

A method and device for installing and distributing routes are disclosed. The routes are classified and installed respectively according to route types. Therefore, the distributed storage of a Forwarding Information Base (FIB) is automated, massive manual configuration work is avoided, and the problem of oversized FIB of the router as a result of fast growth of the routing table is solved.

6 Claims, 5 Drawing Sheets

OTHER PUBLICATIONS

Communication issued in corresponding European Patent Application No. 09720648.6, mailed Apr. 15, 2011.

Zhang et al., "Scaling IP Routing with the Core Router-Integrated Overlay", IEEE 2006. pp. 147-156.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 0x01 or 0x41  |   Sub-Type    |      Global Administrator     |
+-+-+-+-+-+-+-+-+-+-+-+-+-+-+-+-+-+-+-+-+-+-+-+-+-+-+-+-+-+-+-+-+
| Global Administrator (cont.) |       Local Administrator      |
+-+-+-+-+-+-+-+-+-+-+-+-+-+-+-+-+-+-+-+-+-+-+-+-+-+-+-+-+-+-+-+-+
```

FIG. 9

METHOD AND DEVICE FOR INSTALLING AND DISTRIBUTING ROUTES

CROSS-REFERENCE TO RELATED APPLICATIONS

This application is a continuation of International Application No. PCT/CN2009/070466, filed on Feb. 18, 2009, which claims priority to Chinese Patent Application No. 200810065824.1, filed on Mar. 13, 2008, both of which are hereby incorporated by reference in their entireties.

FIELD OF THE DISCLOSURE

The present disclosure relates to network communication technologies, and in particular, to a method and device for installing and distributing routes.

BACKGROUND OF THE DISCLOSURE

Routing is a process of transmitting information from the source to the destination through a network. Routing generally includes two basic actions: determining the best path, and exchanging data. Metric is a metric criterion (such as path length) for determining the best path to the destination in a routing algorithm. To help select the path, the routing algorithm initializes and maintains the routing table that includes path information. The path information varies with the applied routing algorithm. The best mode of telling a router about the destination address or the next-hop address is to send a packet to the router that represents the "next hop". When receiving the packet, the router checks the destination address of the packet, and attempts to correlate this address with the "next hop". A routing table includes multiple types of information such as distance information, hop count, and "next hop" address. The Metric varies with the applied routing algorithm. The routing table compares the Metric to determine the best path. In this way, the routers communicate with each other, and maintain their routing table by exchanging routing information. Route update information generally includes all or partial routing tables. By analyzing the route update information from other routers, a router sets up a network topological view. Another example of sending information between routers is to send link state advertisement information; the router informs other routers of the router's link state, where the other routers have sent the link state advertisement information. The link state advertisement information is used to set up a complete topological view and enable the router to determine the best path.

Multi-homing means that a link group of more than one link (belonging to the same service provider or different service providers) is set up between an end user and a network for the purpose of connection survivability or load balancing. Traffic engineering is a set of tools and methods for retrieving the best service from a given infrastructure no matter whether the network device and the transmission line are normal or not. Traffic engineering involves optimization of the installed resources. With extensive deployment of multi-homing networks and traffic engineering, Internet routes increase rapidly. The capacity of a Forwarding Information Base (FIB) is limited, and a routing table storage chip of greater capacity is required.

SUMMARY OF THE DISCLOSURE

Embodiments of the present disclosure provide the following solution to fully use the existing FIB:

A method for installing routes in an embodiment of the present disclosure includes:

by a node device, obtaining the type of a route in a route update message after receiving the route update message, and checking whether the route is a best route; and determining whether to install the route according to the obtained route type if determining that the route is the best route.

A communication device provided in an embodiment of the present disclosure includes:

a route type determining module, configured to determine the type of a route in a received route update message according to the received route update message;

a best route determining module, configured to determine whether the route is a best route; and an installing module, configured to determine whether to install the route according to the route type determined by the route type determining module if the best route determining module determines that the route is a best route.

Another communication device provided in an embodiment of the present disclosure includes:

a policy module, configured to store one or more route classification policies;

a classifying module, configured to classify routes to be distributed according to the one or more route classification policies stored in the policy module;

a modifying module, configured to label the type of a route in a route update message according to a route classification result of the classifying module; and a distributing module, configured to distribute the route update message labeled by the modifying module.

A method for distributing routes in an embodiment of the present disclosure includes:

by an originating node, classifying routes to be distributed according to one or more preset route classification policies; and labeling the type of a route in a route update message according to a route classification result, and distributing the route through the route update message.

Through the solution under the embodiments of the present disclosure, the FIB distributed storage is automated only if the Border Gateway Protocol (BGP) is modified slightly, without modification of the BGP neighbor deployment or the corresponding policy. Therefore, the massive manual configuration work is avoided, and the problem of oversized FIB of the router as a result of rapid growth of the routing table is solved, and the existing FIB is fully used.

BRIEF DESCRIPTION OF THE DRAWINGS

For a better understanding of the technical solution in the embodiments of the present disclosure or in the prior art, the accompanying drawings for illustrating the embodiments of the present disclosure or the prior art are given below. Apparently, the accompanying drawings are exemplary only, and persons having ordinary skill in the art can derive other drawings from such accompanying drawings without any creative effort.

FIG. 9 shows a schematic structure of a BGP message provided in an embodiment of the present disclosure.

DETAILED DESCRIPTION OF THE EMBODIMENTS

The embodiments of the present disclosure are detailed below with reference to accompanying drawings.

In the embodiments of the present disclosure, a route update message may be a BGP route update message or another message of the similar function. All involved routes are regarded as the best routes, and can be installed into a Routing Information Base (RIB) or a FIB.

When an originating node $R_A$ sends a BGP route update message to its BGP neighboring node $R_B$, the originating node $R_A$ classifies the to-be-distributed route and labels the type of the route in the BGP route update message:

If the route is a type 1 route, all BGP router devices install the route into the FIB.

If the route is a type 2 route, only specific BGP router devices install the route into the FIB.

More specifically, a route type field may be added to the BGP route update message to label the type of a route. For example, "1" represents type 1 and "2" represents type 2. The originating node determines whether the route is a type 1 route or a type 2 route according to one or more preset policies, and labels the type of the route in the route type field. After receiving the route update message, the BGP neighboring node may determine the type of the route according to the label in the route type field.

If the route is a type 2 route, the originating node may add a route originator attribute field to the BGP route update message to label the node that distributes the route. For example, an interface IP address is set in the route originator attribute field to label the originating node; the interface IP address belongs to $R_A$ and is routable in the network. The BGP router device that needs to install the route into the FIB will install the content in this field, and use the content in this field as the next hop of the route. When receiving the BGP route update message, the BGP router device cannot modify the route type field or the route originator attribute field of the route when distributing the route to other BGP neighbors if the BGP router device does not install the route into the FIB.

Here the originating node $R_A$ may be an originating router or another device capable of routing. The BGP neighboring node $R_B$ may be a BGP neighboring router or another device capable of routing.

Figure 1:
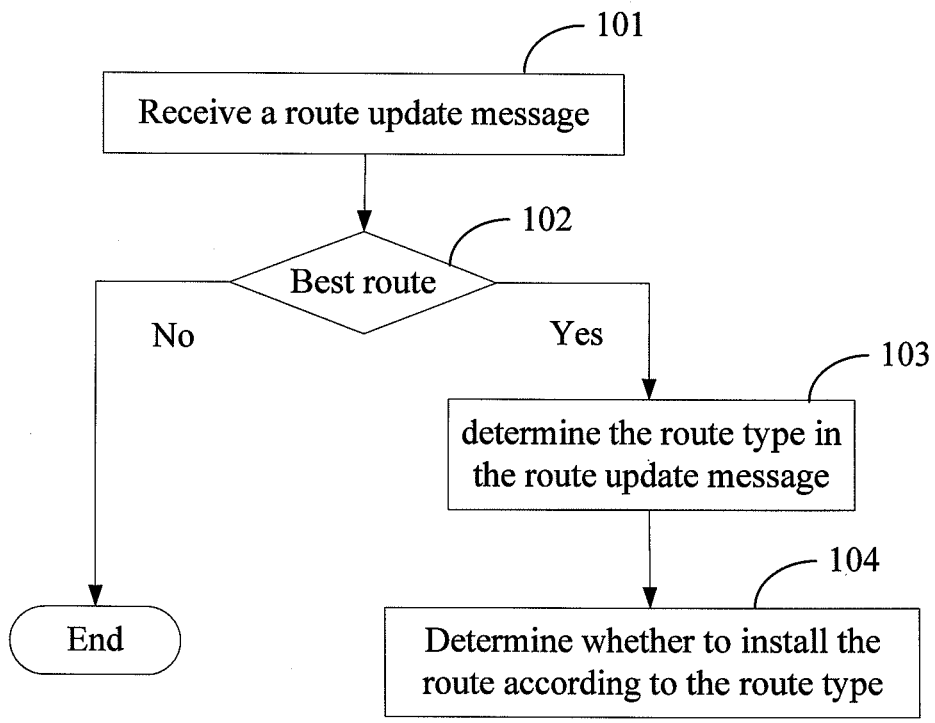
FIG. 1 is a flowchart of a method for installing a route in an embodiment of the present disclosure.

FIG. 1 is a flowchart of installing a route according to an embodiment of the present disclosure. After receiving the BGP route update message from $R_A$ (101), $R_B$ determines whether the route in the BGP route update message is a best route (102); if the route in the BGP route update message is not a best route, the process ends; if the route in the BGP route update message is a best route, $R_B$ determines the route type (103) and determines whether the route will be installed according to the route type (104).

The step of determining the type of the route (103) may occur before, during or after the step of determining whether the route is the best route (102).

Figure 2:
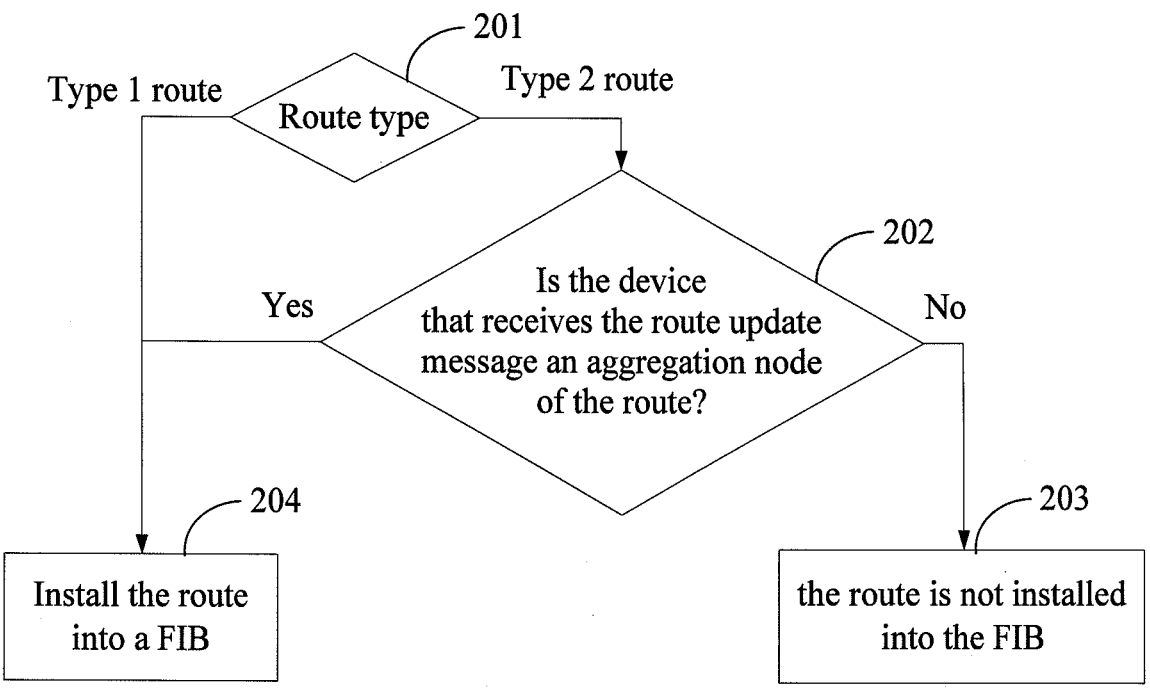
FIG. 2 is a schematic diagram of a method for installing a route according to a route type in an embodiment of the present disclosure.

In the exemplary process of installing a route according to the route type as shown in FIG. 2, when the router classifies the route and determines whether to install the route, the router determines (201) the route type and then installs the route based on different policies according to the route type:

1. If the route is a type 1 route, $R_B$ installs (204) the route into the FIB.

2. If the route is a type 2 route, it is determined (202) that whether aggregation node $R_B$ is the aggregation node of this route. If $R_B$ is not the aggregation node of this route, $R_B$ does not install the route into the FIB (203); if $R_B$ is the aggregation node of this route, $R_B$ installs the route into the FIB (204), and installs the originating node in the route update message as the next hop of the route into the FIB.

Figure 3:
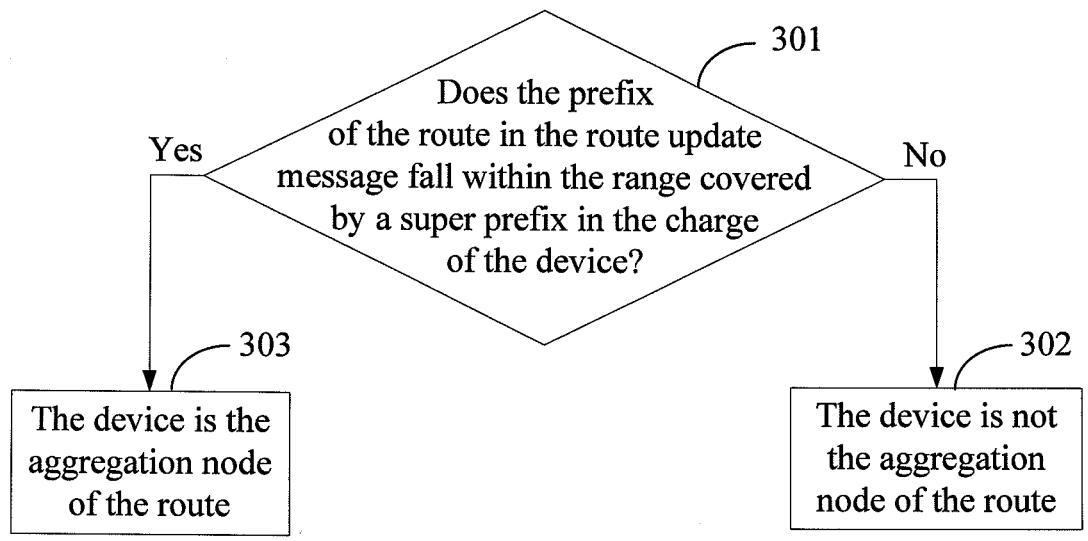
FIG. 3 shows how to determine whether a node device is an aggregation node of a route in an embodiment of the present disclosure.

In the process of determining the aggregation node in FIG. 3, the following principles are applied to determine whether aggregation node $R_B$ is the aggregation node of a specific route (301):

2.1 If the prefix "a" of the route falls within the range covered by the super prefix in the charge of $R_B$, for example, if $R_B$ is an aggregation node in charge of the super prefix 100.0.0.0/8 and "a" is 100.1.0.0/16, $R_B$ is the aggregation node of the route (303).

2.2 If the prefix "a" of the route falls outside the range covered by the super prefix in the charge of $R_B$, for example, if $R_B$ is an aggregation node in charge of the super prefix 100.0.0.0/8 and "a" is 200.1.0.0/16, $R_B$ is not the aggregation node of the route (302).

The aggregation node is a node for distributing routes for a super prefix in a network, for example, the node for distributing the routes for the super prefix 100.0.0.0/8 is an aggregation node of 100.0.0.0/8. The aggregation node is also responsible for installing the routes for the specific prefix covered by the super prefix. For example, the aggregation node of 100.0.0.0/8 is responsible for installing the routes for the prefix such as 100.1.0.0/16 and 100.2.0.0/16.

The type 2 route needs to be installed on the FIB of the corresponding aggregation node. The packets directed to the destination network corresponding to such routes arrive at the corresponding aggregation node that distributes the super prefix according to the route of the super prefix first. The aggregation node forwards the packets to the destination network through a tunnel.

When the aggregation node distributes the route for the super prefix, the Interior Gateway Protocol (IGP) or Exterior Gateway Protocol (EGP) may be applied.

It is appropriate to specify the devices acting as aggregation nodes, and the super prefix in the charge of each aggregation node beforehand. The number of aggregation nodes is not limited. Moreover, one aggregation node may be responsible for distributing routes of multiple super prefixes concurrently; and the routes of one super prefix may be distributed by multiple aggregation nodes. The aggregation nodes may be a backup of one another.

Figure 4:
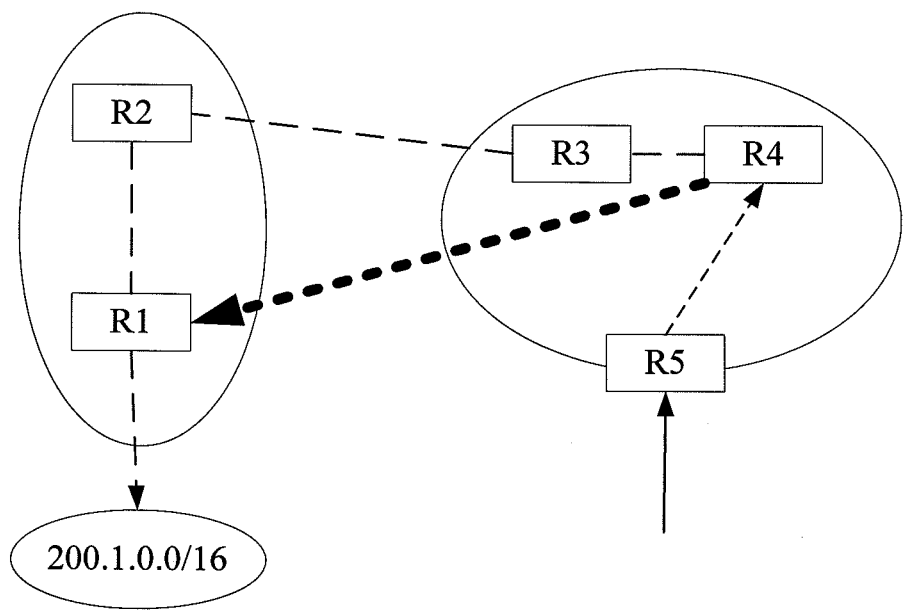
FIG. 4 is a schematic diagram of data forwarding based on a technical solution in a method for installing routes in an embodiment of the present disclosure.

As shown in FIG. 4, R1 is an originating router, R2 and R5 are BGP neighboring routers, R3 is an aggregation node with the super prefix 100.0.0.0/8, and R4 is an aggregation node with the super prefix 200.0.0.0/8. After the corresponding route is installed, when node R5 receives a packet whose destination address is 200.1.1.1, R5 searches its FIB for a route, the route is distributed by the aggregation node R4 and has the super prefix 200.0.0.0/8. After finding the matched route successfully, R5 forwards the packet to R4; if a matched route is not found, R5 may discard the packet.

After receiving the packet, the aggregation node R4 searches the FIB for a matched route, namely, the route for the specific prefix covered by the super prefix 200.0.0.0/8. If finding a matched route successfully, R4 forwards the packet according to the matched route; if a matched route is not found, R4 may discard the packet. For example, if the best matched route is the route for the prefix 200.1.0.0/16 and the corresponding next-hop address is the IP address of R1, R4 performs tunnel encapsulation on the packet and forwards the encapsulated packet to R1. The tunnel encapsulation may be performed through Generic Routing Encapsulation (GRE), IP-in-IP, or Multi-Protocol Label Switching (MPLS). If the IP encapsulation such as GRE or IP-in-IP is applied, the destination IP address of the encapsulated packet is the next-hop address of the route; if the MPLS encapsulation is applied, the destination of the MPSL tunnel is the next-hop address of the route.

The encapsulated packet is forwarded to R1 through R2. After receiving an IP packet, R2 forwards the packet to R1 according to the FIB of R2; after receiving an MPLS packet, R2 forwards the packet to R1 according to the MPLS forwarding table.

After receiving an encapsulated packet, R1 decapsulates the packet, searches R1's FIB for a route that matches the destination IP address 200.1.1.1, and forwards the decapsulated packet to the destination.

In this embodiment, the BGP neighbor deployment or the corresponding policy is not modified; after the BGP protocol and the router software are modified slightly, the FIB distributed storage is automated, and massive manual configuration work is avoided. Through this embodiment, distributed deployment of the FIB is implemented, and the problem of oversized FIB of the router as a result of fast growth of the routing table is solved.

Another method for distributing routes in an embodiment of the present disclosure includes: When an originating node sends a route update message (such as a BGP route update message) to the originating node's BGP neighboring node, the originating node classifies the to-be-distributed route and labels the type of the route in the BGP route update message according to the one or more preset route classification policies such as the following policies:

If the route is a type 1 route, all BGP router devices install the route into the FIB; for example, for a certain route, if the prefix of the route falls within a preset range, the route is listed as a type 1 route.

If the route is a type 2 route, only the specific BGP router devices install the route into the FIB; for example, for a certain route, if the prefix of the route falls within a preset range, the route is listed as a type 2 route.

In detail, a route type field may be added to the BGP route update message to label the type of a route. For example, "1" represents type 1 and "2" represents type 2. The originating node may determine whether a route is a type 1 route or a type 2 route according to one or more preset policies, and labels the type of the route in the route type field. After receiving the route update message, the BGP neighboring node may determine the type of the route according to the label in the route type field.

If the route is a type 2 route, the originating node may add a route originator attribute field to the BGP route update message to label the node that distributes the route. For example, an interface IP address, which belongs to the originating node, and is routable in the network, is used to label the node that distributes the route.

In this embodiment, the BGP neighbor deployment or the corresponding policies is not modified; the BGP protocol and the router software are modified slightly; the routes are classified when the routes are distributed, and the route type is labeled in the route update message; after receiving the route update message, the BGP neighbor applies different route installation policies depending on the route type, thus automating the distributed storage of the FIB, avoiding massive manual configuration work and solving the problem of oversized FIB of the router as a result of fast growth of the routing table.

Figure 5:
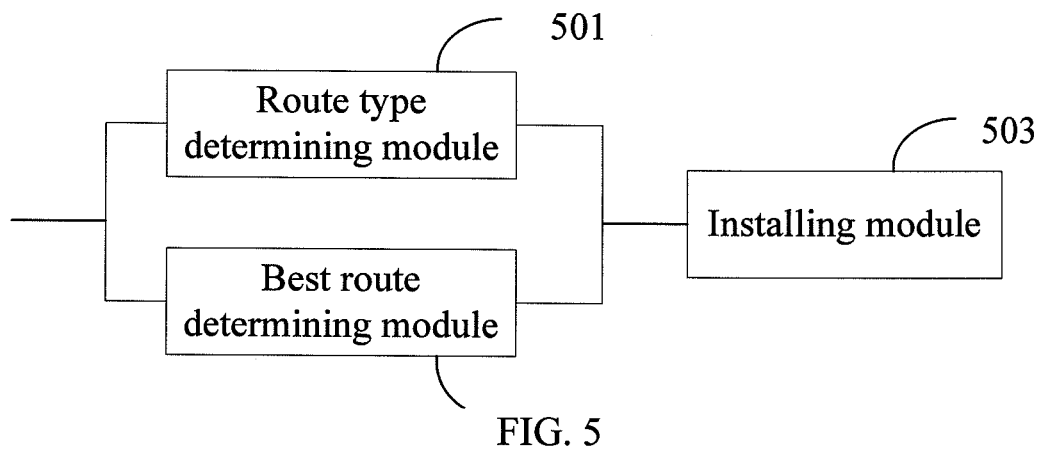
FIG. 5 shows a schematic structure of a communication device provided in an embodiment of the present disclosure.

As shown in FIG. 5, a communication device provided in an embodiment of the present disclosure includes:

a route type determining module 501, configured to determine the type of a route in a received route update message according to the received route update message;

a best route determining module 502, configured to determine whether a route is a best route; and an installing module 503, configured to determine whether to install a route according to the route type determined by the route type determining module 501 if the best route determining module 502 determines that the route is a best route.

For the description purpose, the word "route" hereinafter refers to the best route.

The types of routes and the installation rules are as follows:

If a route is a type 1 route, all BGP router devices install the route into the FIB.

If a route is a type 2 route, only specific BGP router devices install the route into the FIB. A specific BGP router device refers to the BGP router device that is an aggregation node of the route.

Figure 6:
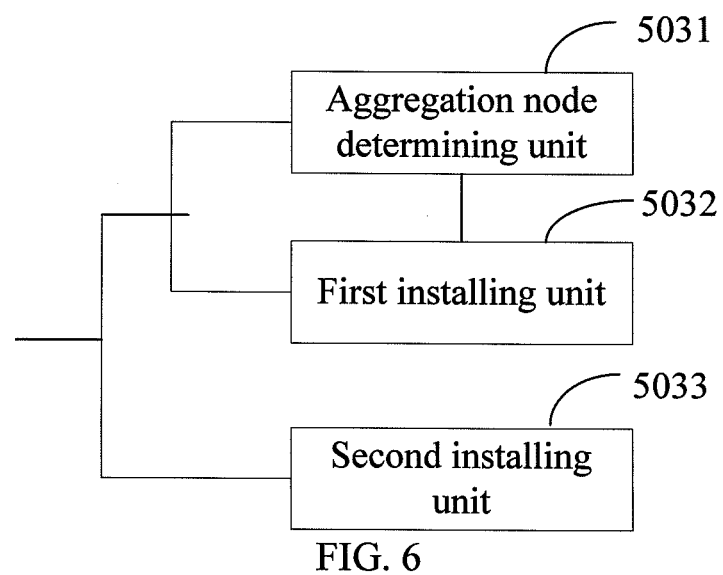
FIG. 6 shows a schematic structure of an installing module in a communication device provided in an embodiment of the present disclosure.

As shown in FIG. 6, when the route type determining module 501 determines that a route is a type 2 route, the installing module 503 may include an aggregation node determining unit 5031; the aggregation node determining unit 5031 is configured to determine whether the device itself is an aggregation node of the route.

Moreover, the installing module 503 may include a first installing unit 5032. The first installing unit 5032 is configured to install the route into the FIB if the aggregation node determining unit 5031 determines that the device itself is an aggregation node of the route. Moreover, for the type 2 route, if the device itself is an aggregation node of the route, the first installing unit 5032 installs the originating node in the route update message as the next hop of the route into the FIB.

When the route type determining module 501 determines that the route is a type 1 route, the installing module 503 may include a second installing unit 5033, and the second installing unit 5033 is configured to install the route into the FIB.

In this embodiment, the BGP neighbor deployment or the corresponding policy is not modified; after the BGP protocol and the router software are modified slightly, the routes are classified, the distributed storage of the FIB is automated, and massive manual configuration work is avoided. Through this embodiment, distributed deployment of the FIB is implemented, and the problem of oversized FIB of the router as a result of fast growth of the routing table is solved.

Figure 7:
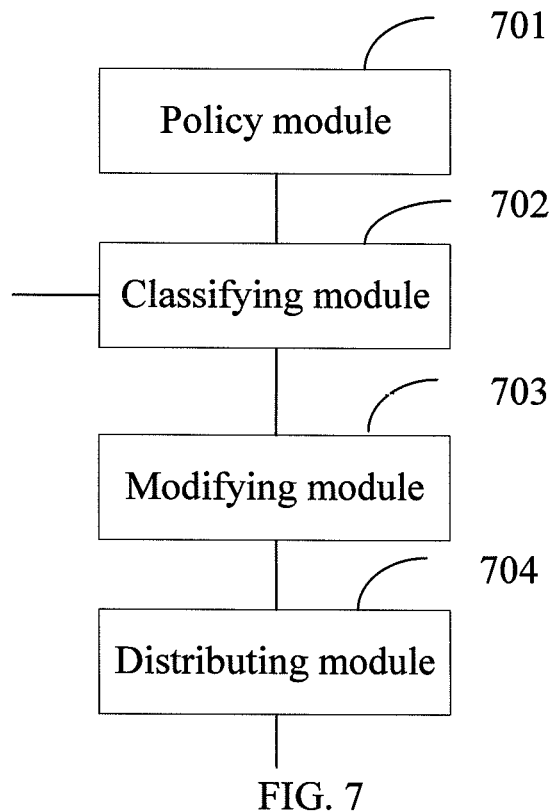
FIG. 7 shows a schematic structure of another communication device provided in an embodiment of the present disclosure.

Moreover, another communication device is provided in an embodiment of the present disclosure. The communication device is generally used as an originating node, and especially an originating router. As shown in FIG. 7, the communication device includes:

a policy module 701, configured to store one or more route classification policies;

a classifying module 702, configured to classify routes to be distributed according to the one or more route classification policies stored in the policy module 701;

a modifying module 703, configured to label the type of a route in a route update message according to a route classification result of the classifying module 702; and a distributing module 704, configured to distribute the route update message labeled by the modifying module 703.

Figure 8:
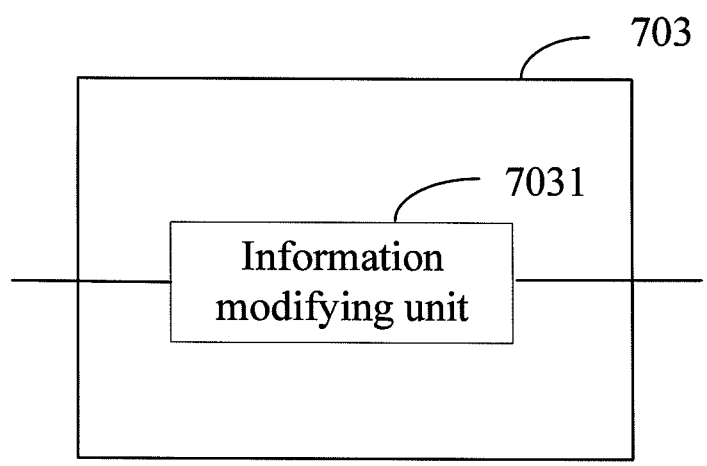
FIG. 8 shows a schematic structure of a modifying module in a communication device provided in an embodiment of the present disclosure.

As shown in FIG. 8, when the classifying module 702 determines that the route is a type 2 route, the modifying module 703 may include an information modifying unit 7031, which is configured to add information about the device itself to the route update message, for example, add an interface IP address of the device to the route update message, where the interface IP address of the device is routable in the network.

The route update message may be a BGP route update message or another message of the similar function.

In this embodiment, the BGP neighbor deployment or the corresponding policies is not modified; the BGP protocol and the router software are modified slightly; the routes are classified when the routes are distributed, and the route type is labeled in the route update message; after receiving the route update message, the BGP neighbor applies different route installation policies depending on the route type, thus automating the distributed storage of the FIB, avoiding massive manual configuration work and solving the problem of oversized FIB of the router as a result of fast growth of the routing table.

Moreover, a computer-readable medium is provided in an embodiment of the present disclosure. The computer-readable medium may be a medium that incorporates, stores, conveys, propagates, or transmits computer programs. The computer programs are programs that use instructions to run the method, system apparatus, system, or device under the present disclosure, or programs related to the instructions. The computer-readable medium may be a system, apparatus, device, propagation medium, or computer storage, which is of the electronic, magnetic, electromagnetic, optical, infrared, or semiconductor nature.

In the embodiments of the present disclosure, when the computer program runs, the following steps are implemented:

determining the type of a route in a route update message after receiving the route update message; and determining whether to install the route according to the type of the route if the route is a best route;

suppressing an installation of the route into a FIB if the route is a type 2 route and the device itself is not an aggregation node of the route;

installing the route into the FIB if the device is an aggregation node of the route; and installing the route into the FIB without determining whether the device is an aggregation node if the route is a type 1 route;

installing the interface IP address of the originating node as a next hop of the route into the FIB if the route is a type 2 route, where the route update message further carries information about the originating node, for example, an interface IP address of the originating node and the interface IP address of the originating node is routable in the network.

The step of determining whether the device is an aggregation node of the route, comprises:

determining whether a prefix of the route in the route update message falls within the range covered by a super prefix in the charge of the device; and determining that the device is an aggregation node of the route if the prefix of the route in the route update message falls within the range covered by the super prefix in the charge of the device; determining that the device is not an aggregation node of the route if the prefix of the route in the route update message falls outside the range covered by the super prefix in the charge of the device.

The step of determining the type of the route comprises: determine the type according to a route type attribute field in the route update message.

In other embodiments of the present disclosure, when the computer program runs, the following steps are implemented:

classifying the routes to be distributed according to one or more preset route classification policies; labeling the type of a route in a route update message (such as a BGP route update message) according to a route classification result; and distributing the route through the route update message; and adding information about the originating node to the route update message if the route classification result shows that the route is a type 2 route, for example, adding an interface IP address of the originating node to the route update message and the interface IP address of the originating node is routable in the network.

It should be noted that the route type attribute and the originating node attribute may be carried in an existing relevant extended community attribute of IP addresses of BGP, but the prerequisite is that the Internet Assigned Numbers Authority (IANA) assigns a special sub-type value, and that the special sub-type value is exclusively used for the purpose of the present disclosure. The specific structure is shown in FIG. 9. Once the route update message carries the extended community attribute, the route is regarded as a type 2 route, and a global administrator field carries the information about the originating node. If there is no extended community attribute carried in the route update message, the route is regarded as a type 1 route. Nevertheless, other types of extended community attributes (such as the Autonomous System (AS)-related type and opaque type) may be used to fulfill the same objective.

In the embodiments of the present disclosure, the BGP neighbor deployment or the corresponding policies is not modified; the BGP protocol and the router software are modified slightly; the routes are classified when the routes are distributed, and the route type is labeled in the route update message; after receiving the route update message, the BGP neighbor applies different route installation policies depending on the route type, thus automating the distributed storage of the FIB, avoiding massive manual configuration work and solving the problem of oversized FIB of the router as a result of fast growth of the routing table.

Persons of ordinary skill in the art should understand that all or part of the steps of the method under the present disclosure may be implemented by a program instructing relevant hardware. The program may be stored in a computer readable storage medium. When the program runs, the steps of the method specified in the above embodiments are performed. The storage medium may be a magnetic disk, a CD-ROM, a Read-Only Memory (ROM), or a Random Access Memory (RAM).

The above descriptions are merely exemplary embodiments of the present disclosure, but are not intended to limit the scope of the present disclosure. Any modifications, variations or replacement that can be easily derived by those skilled in the art without departing from the spirit and scope of the disclosure shall fall within the protection scope of the present disclosure.

What is claimed is:

1. A method for installing a route, comprising:

by a node device, obtaining the type of a route in a route update message after receiving the route update message, and determining whether the route is a best route; and determining whether to install the route according to the obtained route type if determining that the route is a best route;

wherein: if the route obtained by the node device is a type 2 route, the method further comprises:

determining whether the node device is an aggregation node of the route;

the step of determining whether to install the route according to the obtained route type comprises:

suppressing an installation of the route into a Forwarding Information Base (FIB) if the node device is not an aggregation node of the route;

installing the route into the FIB if the node device is an aggregation node of the route;

wherein the step of the node device determining whether the node device is an aggregation node of the route comprises:

by the node device, determining whether a prefix of the route in the route update message falls within a range covered by a super prefix in the charge of the node device; and determining that the node device is an aggregation node of the route if the prefix of the route in the route update message falls within the range covered by the super prefix in the charge of the node device; determining that the node device is not an aggregation node of the route if the prefix of the route in the route update message falls outside the range covered by the super prefix in the charge of the node device.

2. The method according to claim 1, further comprising:

determining, by the node device, the route type according to the received route update message; and installing the route into a FIB if the route is determined as a type 1 route.

3. The method according to claim 1, wherein:

if the route is a type 2 route, the route update message further carries information about an originating node.

4. The method according to claim 1, wherein:

the step of obtaining the type of the route in the route update message comprises: obtaining the type of the route in the route update message according to a route type field in the route update message.

5. The method according to claim 1, wherein:

the route update message is a Border Gateway Protocol (BGP) route update message.

6. The method according to claim 3, wherein:

the information about the originating node is an interface Internet Protocol (IP) address of the originating node and the interface IP address of the originating node is routable in a network; and if the node device is an aggregation node of the route, the IP address is installed as a next hop of the route into a FIB.

* * * * *